(12) United States Patent
Yochai et al.

(10) Patent No.: US 7,454,668 B1
(45) Date of Patent: Nov. 18, 2008

(54) TECHNIQUES FOR DATA SIGNATURE AND PROTECTION AGAINST LOST WRITES

(75) Inventors: Yechiel Yochai, Lincoln, RI (US); Stephen R. Ives, West Boylston, MA (US); Michael Scharland, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 544 days.

(21) Appl. No.: 11/234,612

(22) Filed: Sep. 23, 2005

(51) Int. Cl.
*G06F 11/00* (2006.01)
(52) U.S. Cl. .......................... 714/52
(58) Field of Classification Search .............. 714/52, 714/21, 32, 39, 42, 54
See application file for complete search history.

(56) References Cited

U.S. PATENT DOCUMENTS

| | | | |
|---|---|---|---|
| 5,206,939 A | 4/1993 | Yanai et al. | |
| 5,522,032 A * | 5/1996 | Franaszek et al. | 714/6 |
| 5,778,394 A | 7/1998 | Galtzur et al. | |
| 5,845,147 A | 12/1998 | Vishlitzky et al. | |
| 5,857,208 A | 1/1999 | Ofek | |
| 6,112,319 A * | 8/2000 | Paulson | 714/49 |
| 7,020,835 B2 * | 3/2006 | Loaiza et al. | 714/807 |
| 2004/0034817 A1* | 2/2004 | Talagala et al. | 714/42 |
| 2004/0153746 A1* | 8/2004 | Talagala et al. | 714/8 |
| 2006/0031722 A1* | 2/2006 | Kolvick et al. | 714/52 |

* cited by examiner

*Primary Examiner*—Nadeem Iqbal
(74) *Attorney, Agent, or Firm*—Muirhead and Saturnelli, LLC (57) ABSTRACT

Described are techniques for verifying data. A write operation request for writing to a first data block is received. A first copy of an identifier for said first data block in a memory is updated. A second copy of the identifier for the first data block is updated. The second copy is stored with the first data block on a data storage device. A read operation request is received for the first data block. The first data block and an associated identifier from the data storage device are read. Data verification processing is performed for the first block in accordance with the associated identifier, the first copy from the memory, and any pending write operations for the first data block.

19 Claims, 8 Drawing Sheets

TECHNIQUES FOR DATA SIGNATURE AND PROTECTION AGAINST LOST WRITES

BACKGROUND

1. Technical Field

This application generally relates to data storage, and more particularly to techniques used in connection with data verification.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In existing systems, write operations may be processed by first storing the data to be written in a cache or other intermediate location. At this point, the write operation may be characterized as a pending write operation which is then written out to the physical device at a later point. From time to time due to a hardware and/or software problem, a pending write operation, which is acknowledged as successfully completed to a host originating the write operation, is not successfully written out to the physical devices. In such an instance, the version of data on the physical devices may be valid, but out of date, and there may be no way to detect such a condition for a subsequent read of the data.

SUMMARY OF THE INVENTION

In accordance with one aspect of the invention is a method for verifying data comprising: receiving a write operation request for writing to a first data block; updating a first copy of an identifier for said first data block in a memory; updating a second copy of said identifier for said first data block and storing said second copy with said first data block on a data storage device; receiving a read operation request for said first data block; reading said first data block and an associated identifier from the data storage device; and performing data verification processing for said first block in accordance with said associated identifier, said first copy from the memory, and any pending write operations for said first data block. The method may also include determining a data verification error if said first copy and said associated identifier match and there is at least one pending write operation for said first data block. The first copy of said identifier for said first data block may be updated each time a write operation request is received. The method for verifying data may be performed in a data storage system for data operations received from a host originating said data operations. The method may also include determining that there is no data verification error if said first copy and said associated identifier match and there are no pending write operations for said first data block. The method may also include determining that there is no data verification error if said first copy and said associated identifier are different, and a difference between a value of said first copy and a value of said associated identifier is in accordance with a number of pending write operation requests. The data verification processing may include determining if a write operation request was received and not written out to the physical device. The memory may be a globally accessible memory in a data storage system, said first copy of said identifier may be included in a structure stored in the memory, the structure having an identifier for each block of user data on the data storage device. The identifier for each block of user data may represent a relative age of a version of data stored at said each block in comparison to another version of data stored at said each block at a different point in time. The identifier for each block of user data may be a field having a size of two bits. The identifier for each block of user data may be included in another field comprising the logical block address of said each block of user data on the data storage device. The difference may correspond to a relative age difference between a copy of said first data block associated with said first copy of the identifier and a current version of said first data block. The method may also include determining, in accordance with said performing, that there is a data verification error, wherein there are two different versions of said first data block on two different mirrors in a data storage system, a first of said two different versions of said first data block having a first version of said associated identifier, a second of said two different versions of said first data block having a second version of said associated identifier; and using said first version and said second version of said associated identifier to determine a most recent version of said first data block.

In accordance with another aspect of the invention is a computer program product for verifying data comprising code that: receives a write operation request for writing to a first data block; updates a first copy of an identifier for said first data block in a memory; updates a second copy of said identifier for said first data block and storing said second copy with said first data block on a data storage device; receives a read operation request for said first data block; reads said first data block and an associated identifier from the data storage device; and performs data verification processing for said first block in accordance with said associated identifier, said first copy from the memory, and any pending write operations for said first data block. The computer program product may also include code that: determines a data verification error if said first copy and said associated identifier match and there is at least one pending write operation for said first data block. The first copy of said identifier for said first data block may be updated each time a write operation request is received. The computer program product may also include code that determines that there is no data verification error if said first copy and said associated identifier match and there are no pending write operations for said first data block, and determines that there is no data verification error if said first copy and said associated identifier are different, and a difference between a value of said first copy and a value of said associated identifier is in accordance with a number of pending write operation requests.

In accordance with another aspect of the invention is a data storage system comprising code that: receives a write operation request for writing to a first data block; updates a first copy of an identifier for said first data block in a memory; and updates a second copy of said identifier for said first data block and storing said second copy with said first data block on a data storage device. The data storage system may further comprise code that: receives a read operation request for said first data block; reads said first data block and an associated identifier from the data storage device; and performs data verification processing for said first block in accordance with said associated identifier, said first copy from the memory, and any pending write operations for said first data block; and wherein said data storage system may further include said memory which is a globally accessible memory to components in said data storage system, said first copy of said identifier being included in a structure stored in the memory, the structure having an identifier for each block of user data on the data storage device. The identifier for each block of user data may represent a relative age of a version of data stored at said each block in comparison to another version of data stored at said each block at a different point in time, said identifier for each block of user data is a field having a size of two bits, said identifier for each block of user data being included in another field comprising the logical block address of said each block of user data on the data storage device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
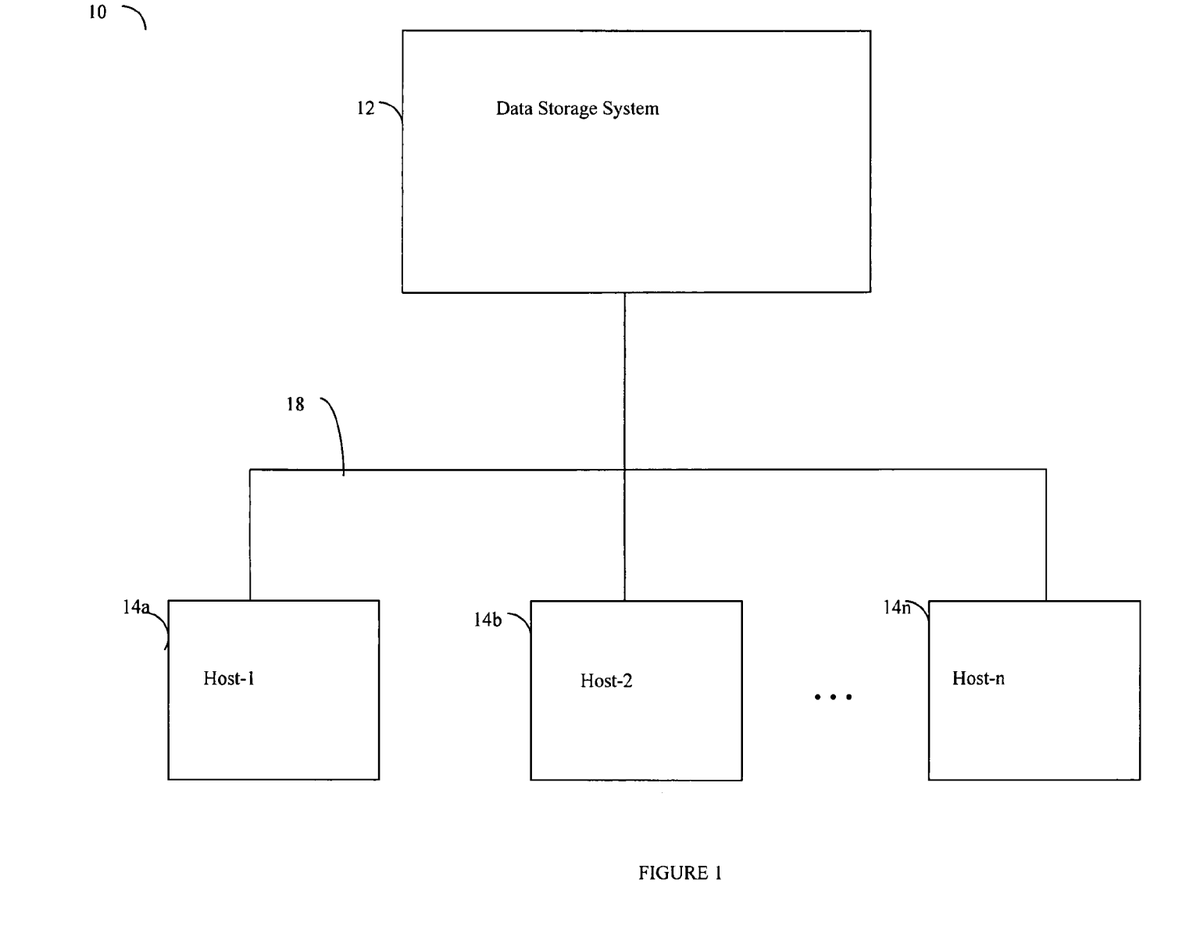
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
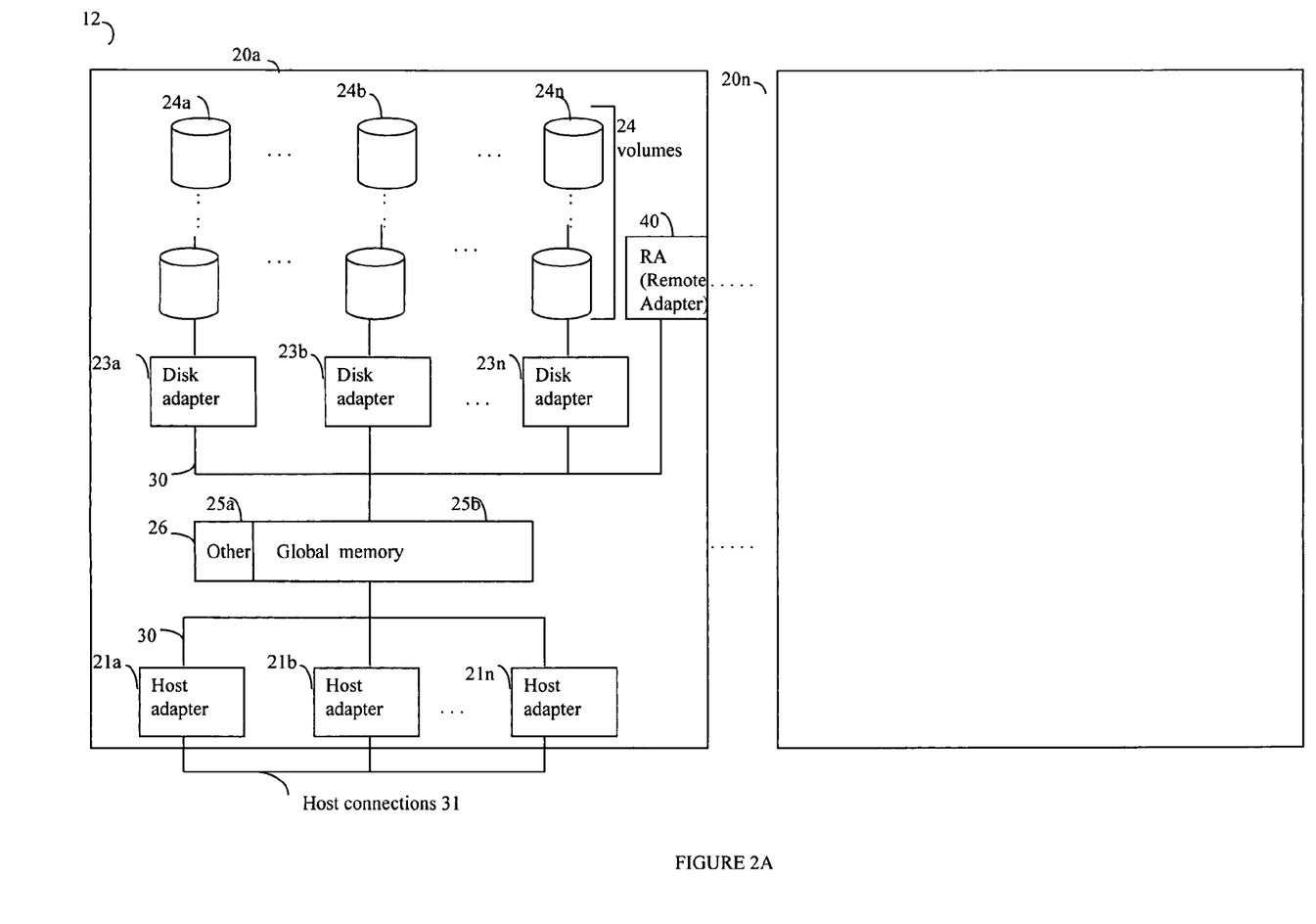
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
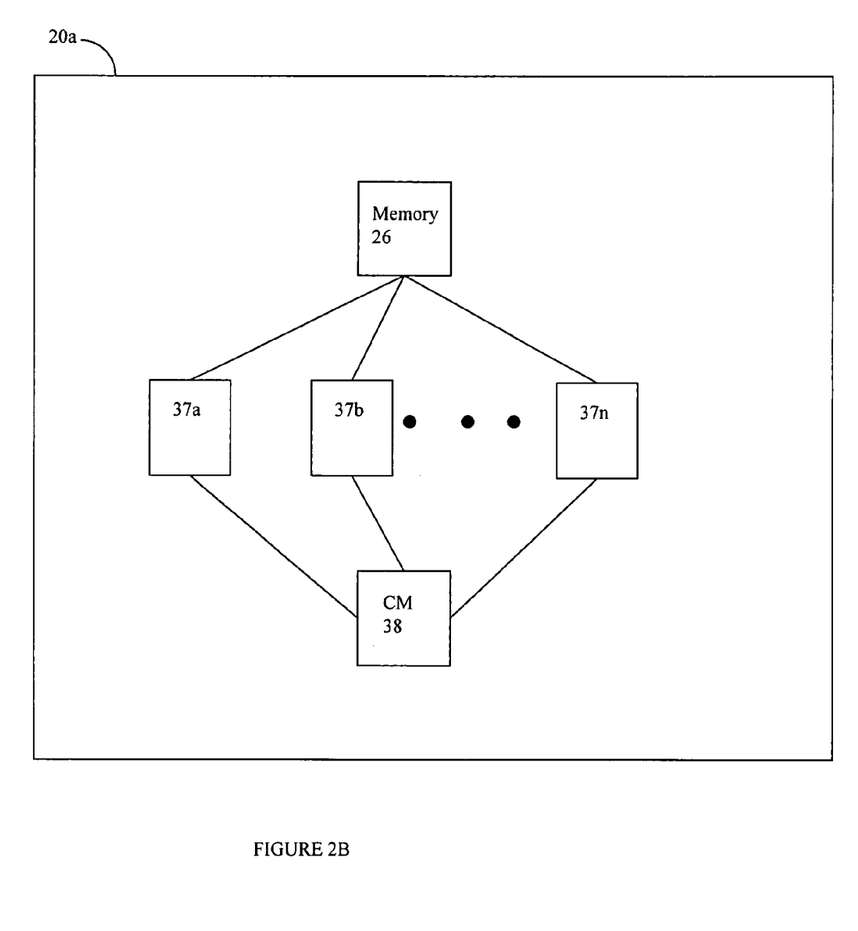
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As known to those of ordinary skill in the art, different techniques may be used in connection with data verification and data integrity. Data may be represented and stored in accordance with a standard, such as the Data Integrity Format (DIF) standard. In one embodiment, the block-level DIF standard may be utilized which includes a 16-bit CRC (cyclic redundancy check). As also known to those in the art, a CRC may be characterized as a type of check value used to verify the integrity of an associated user data block. In connection with the DIF standard, the user data and its CRC value, along with other signature data, are stored on a data storage device in a defined format. When reading the user data from the device, a CRC value of the user data is calculated and then compared to the stored CRC value. If there is a difference in between the calculated CRC value and the stored CRC value, it is determined that there is a data validity error. However, since the CRC value and the user data are stored together, the foregoing, without more, does not provide for detection of write operations which may be characterized as "lost" or "unperformed". In some cases, write operations may be processed by first storing the data to be written in a cache or other intermediate location. At this point, the write operation may be characterized as a pending write operation. The data for the pending write operation is then written out to the physical device at a later point. From time to time due to a hardware and/or software problem, a pending write operation, which is acknowledged as successfully completed to a host originating the write operation, is not successfully written out to the physical devices. In such an instance, the version of data on the physical devices may be valid, but out of date, and the foregoing DIF standard does not provide for detection of such a condition in which the pending write operation does not complete successfully. For example, a write operation may be received from the host and stored in a cache slot marked as write pending. Once in the cache, the host may receive an acknowledgement that the write operation has been completed successfully. However, the write operation data may not yet be written out to the physical device. Subsequently, the DA servicing the physical device processes the pending writes in the cache for the device. Due to a hardware and/or software problem, the pending write data in the cache may not ever be written out to the specified target location on the physical device such that the version of the data on the physical device is stale or out of date with respect to the version expected by the host. The detection of the stale version and/or lost write may go undetected and a subsequent read from the same target location may proceed with using the yet undetected stale version of the data.

It should be noted that in the event that an embodiment utilizes device mirroring techniques so that there are multiple copies of the same data written out to a device, data validity problems in connection with a write operation may exist if, for example, the updated version of the data (e.g., the result after applying the write operation) appears in some, but not all, mirrors. For example, a first mirror, M1, and a second mirror, M2, may each include a different version of the data. Both copies of M1 and M2 may be characterized as valid by having correct CRC values. However, if the pending write is discarded or otherwise lost when this data difference between M1 and M2 is detected, the data storage system may not be able to determine which of M1 and M2 contains the most recent version of the data.

What will be described in following paragraphs are techniques that may be used in connection with detection of such lost or unperformed write operations in order to prevent a subsequent use of the stale data. Additionally, in embodiments utilizing mirroring, the techniques described herein may be used in connection with determining a most recent data version.

Figure 3:
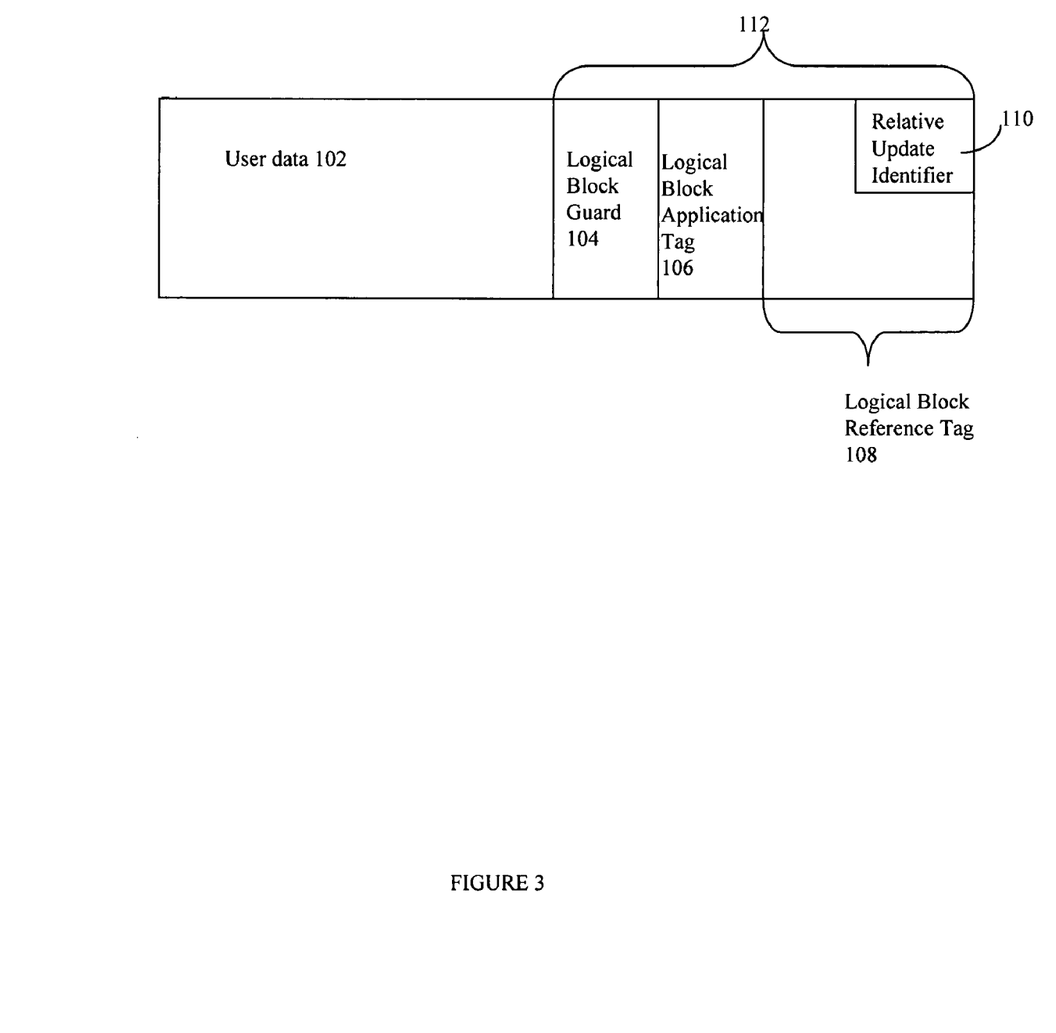
FIG. 3 is an example representation of a format for storing a block of user data and an associated signature portion.

Referring now to FIG. 3, shown is an example representation of a data format. The illustration 100 specifies a data format in accordance with the block-level DIF standard for storing a block of user data 102 with its corresponding signature portion 112. The portion 112 includes a Logical Block Guard field 104, a Logical Block Reference Tag 108 and a Logical Block Application Tag 106. The Logical Block Reference Tag 108 specifies the logical block address or LBA which is the target location of the write operation. Also included in the LBA 108 is a relative update identifier 110. An embodiment may designate a portion of the Logical Block Reference Tag 108, such as 2 bits, to correspond to the relative update identifier 110 used to represent a relative version of the corresponding user data. In one embodiment, field 110 may be designated as the most significant 2 bits of the Logical Block Reference Tag field 108, and the user data portion 102 may be one block of 512 or 520 bytes of data. Logical Block Guard field 104 may be characterized as a type of CRC value described elsewhere herein in more detail. The Logical Block Application tag 106 includes other data that may be used in connection with other processing in accordance with the specified standard.

It should be noted that although the fields of FIG. 3 may be in accordance with a particular standard, one of ordinary skill in the art will appreciate that the techniques described herein may be performed using other values represented in these exemplary fields and format in accordance with other formats and standards.

As will be described in more detail herein, the relative update identifier 110 may represent a version of the user data 102 with respect to other versions of user data for a same data block. For example, a first value for 110 may be associated with the version of user data at block "X" prior to a write operation. A second value for 110 may be associated with the version of the user data at block "X" after applying the write operation. Data may be stored in the physical device by the DA in accordance with the format 100 of FIG. 3.

As will be appreciated by those skilled in the art, the specific values, formats, examples, and the like, described herein are for purposes of illustrating the techniques herein and should not be construed as a limitation of such techniques.

Figure 4:
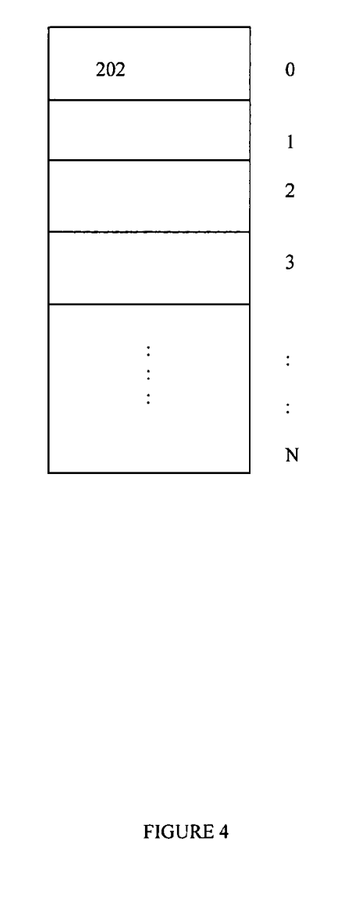
FIG. 4 is an example representation of a table of relative update identifiers for blocks of data.

Referring now to FIG. 4, shown is an example of a table 200 of relative update identifiers that may be used in connection with the techniques described herein. The table 200 may be stored in a data storage system's GM. The table 200 includes an entry 202 for each user data block as represented in accordance with a format, such as illustrated in connection with FIG. 3, having a relative update identifier for a block of data. In this example, the "mth" data block has its current relative update identifier value also stored in the "mth" entry of the table 200, although other mappings of data blocks to corresponding entries in 200 can be utilized in other embodiments such as, for example, each entry of table 200 corresponding to the current relative update identifier for an arbitrary number of consecutive user data blocks. It should be noted that in the embodiment described herein, each entry 202 is the same size (e.g., number of bits) as the size of field 110 illustrated in format 100. As will be described elsewhere herein, values in the table 200 may be updated in accordance with received write operation processing.

As will be described in following paragraphs, the relative update identifier values 110 as may be stored on the physical devices with user data portions and the relative update identifier values stored in table 200 may be used in connection with data validity processing. These values may be used in connection with detection of stale data due to lost, or otherwise incomplete, write operations, and in determining the most recent copy of user data. The particular size of each relative update identifier may vary with embodiment as needed to distinguish between the relative age or update of each data block. It may be desirable to select the size of the relative update identifier while considering the space requirements to store such information for each user data block in the table 200 in GM. In the embodiment described herein, two bits are used to represent each value of 110 although this size may vary with embodiment.

Figure 5:
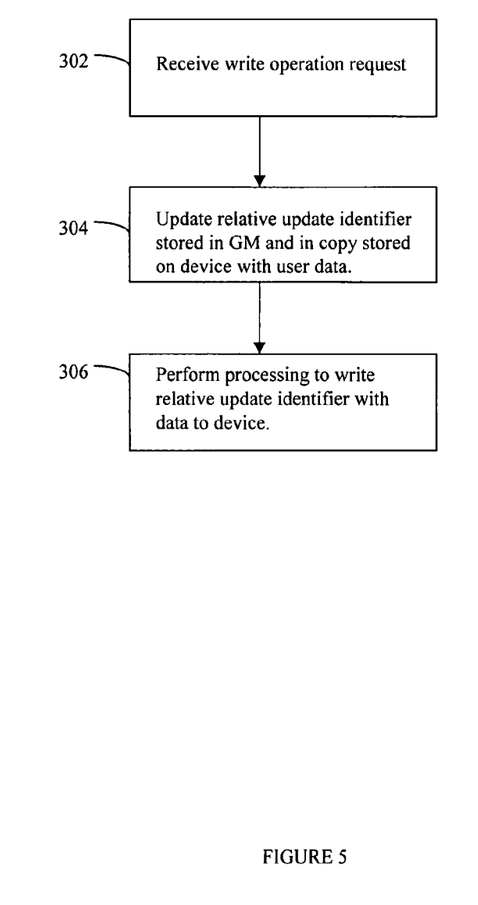
FIG. 5 is a flowchart of processing steps that may be performed in an embodiment in connection with a write operation.

Referring now to FIG. 5, shown is a flowchart of processing steps that may be performed in an embodiment in connection with processing each write operation. The steps of flowchart 300 may be performed by a DA, other director, or other component in the data storage system causing the data to be characterized as "write pending" data to be written out to a data storage device. It should be noted that the component performing the processing steps may vary with operation being performed by the data storage system. For example, an HA receiving a host request to perform a write operation may perform the steps of flowchart 300. There may be other operations performed by the data storage system, such as in connection with a device-to-device internal copy within the data storage system, when a DA may perform the processing of flowchart 300. The particular operations and components that may perform the processing of flowchart 300 may vary with embodiment. At step 302, the write operation request is received by the data storage system. In one embodiment, a cache slot for the write operation request may be obtained and the write operation request and corresponding data are placed in the cache slot. The cache slot is then marked as write pending and is written out to the physical device at a later point in time by the DA servicing that physical device. At step 304, the relative update identifier stored in GM corresponding to the target location of the write operation request is updated. In the embodiment described herein, step 304 includes incrementing the corresponding entry in table 200 for the data block which is modified by the received write operation. Once the relative update identifier value reaches the maximum value (e.g., binary representation of "11", or 3), the relative update identifier value cycles back to 0. The copy of the relative update identifier 110 as stored with the user data is also updated. Performing step 304 also includes updating the value of 110 as stored in the cache slot for the write pending data. At step 306, processing is subsequently performed to write the write pending data with the relative update identifier, and other information in accordance with the format 100, to the physical device.

In accordance with the processing steps of flowchart 300 of FIG. 5, each received write operation results in updating the relative update identifier for the data block which is modified by the write operation. As will be appreciated by those skilled in the art, a write operation may result in modification of multiple data blocks. Additionally, each write operation may operate on a portion or chunk of data comprising multiple blocks even though not all of the blocks in the portion or chunk are modified. In one embodiment, processing of flowchart 300 of FIG. 5 may be performed to associate the same relative update identifier value with each block in the portion as used in connection with the data operation. For example, data operations may be performed utilizing 16 blocks of data even though a write operation may only modify one or two of these 16 blocks of data. In one embodiment, processing may be performed to copy the same relative update identifier for use with all 16 data blocks associated with the write operation even though only one or two data blocks are modified as result of the write operation. In such an embodiment, step 304 processing may accordingly update the relative update identifiers in GM for each of the 16 blocks, and step 306 may also accordingly update the relative update identifiers for each of the 16 blocks as stored on the physical storage device. Other variations are described elsewhere herein in more detail.

Figure 6:
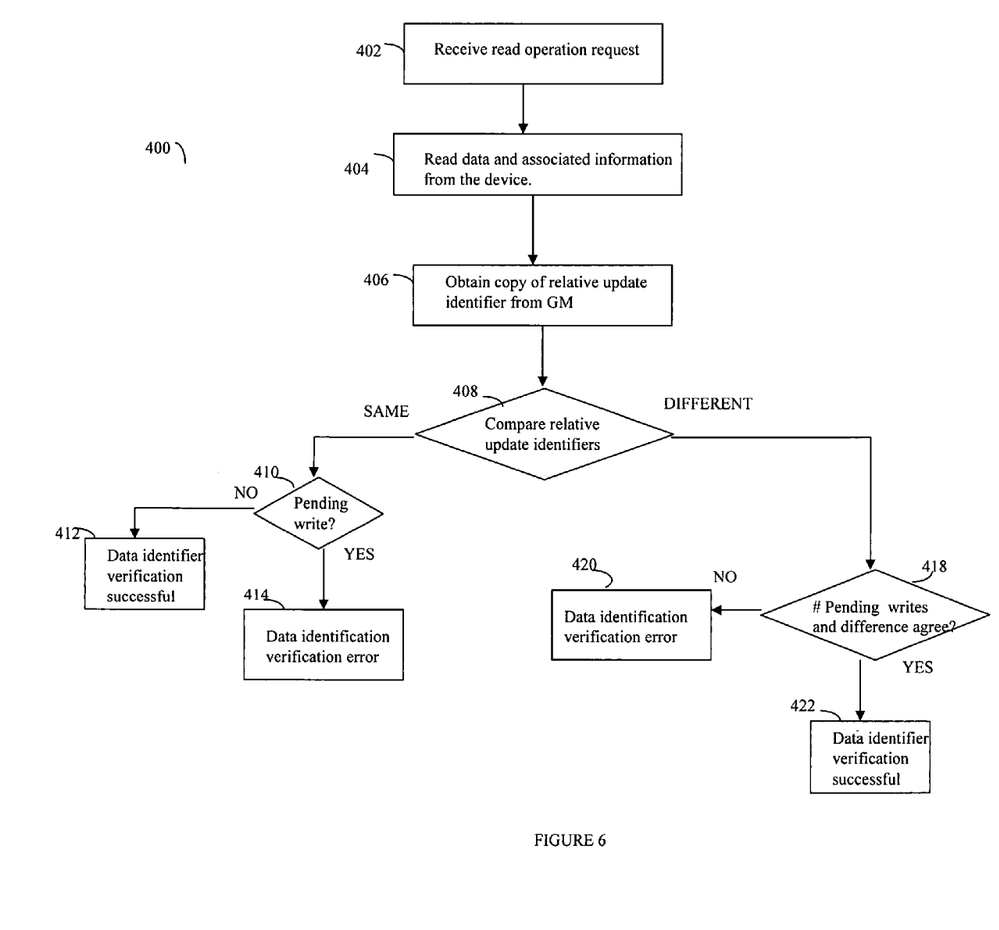
FIG. 6 is a flowchart of processing steps that may be performed in an embodiment in connection with a read operation.

Referring now to FIG. 6, shown is a flowchart of processing steps that may be performed in connection with processing a read operation request. The processing steps of 400 of FIG. 6 may be performed by a DA. It should be noted that the flowchart 400 of FIG. 6 will be described with reference to operation on a single block of data for the sake of simplicity in illustrating the techniques described herein. Subsequently, variations of this are described as may be used in connection with multiple data blocks.

At step 402, the DA receives the read operation request. At step 404, the DA reads the data and associated information from the physical device for the requested data block. The DA obtains a copy of the relative update identifier for this data block from the table 200 at step 406. At step 408, a comparison is made between the relative update identifier as obtained from GM and the relative update identifier as read from the physical device and stored with the user data. If the relative update identifiers are the same, control proceeds to step 410 where a determination is made as to whether there are any write pending operations for this user data block. This may be determined using any one of a variety of different techniques. In one embodiment, collective information about each data block and device may be stored in other tables in GM of the data storage system. Such information may include, for example, which blocks are stored in cache in slots designated as write pending. If step 410 evaluates to no, control proceeds to step 412 where the verification as performed in accordance with the relative update identifiers is deemed successful in that the data read from the device has been successfully verified and does not include stale or outdated data. If step 410 evaluates to yes, control proceeds to step 414 where the verification as performed in accordance with the relative update identifiers is deemed unsuccessful due to the relative update identifier mismatch. Since the corresponding relative update identifier is modified each time a new write operation request is received, the two values at step 408 should not match in the event there is a write pending request for the same location now being read. In the event of an error detection as in step 414, an embodiment may perform any one or more different processing steps. For example, once the data problem has been detected, processing may be performed to try and recover the correct data. Data recovery processing may include, for example, an attempt to recover the data for the physical storage device from alternative copies of the data, such as one or more data mirrors, that may be included in an embodiment. An embodiment may also try to recover the data using, for example, RAID techniques. An embodiment may also mark the detected bad or stale data blocks and perform data recovery processing at a different point in time, or not at all. In an embodiment utilizing mirroring, the relative update identifier associated with each mirrored set of a data block can be used to determine the most recent copy of the data. For example, 3 mirrors may be used and 2 of the 3 mirrors for a given data block may each have an associated relative update identifier value of "2" as stored on the physical devices with the data. A third mirror may have an associated relative update identifier value of "3". It may be determined that the third mirror has the most recent copy of the data, and accordingly, an embodiment may take steps to update the copies on the other two mirrors.

If step 408 determines that the relative update identifiers are different, control proceeds to step 418 where a determination is made as to whether the difference between the two values is in accordance with the number of pending write operations. Since the relative update identifier in GM is increased each time a write operation is received, the difference between the relative update identifier in GM and the relative update identifier stored with the data on the device should be equal to the number of pending writes for a given location. If step 418 evaluates to yes, control proceeds to step 422 where data verification success status is determined similar to that as described in connection with step 412. Otherwise, if step 418 evaluates to no, control proceeds to step 420 and a data verification error is determined similar to that as described in connection with step 414.

As described elsewhere herein in connection with FIG. 5, a write operation may operate on fixed size portions of data, such as 16 block "chunks" or portions, even though not all of the blocks in this portion are modified. Similarly, a read or other data operation may also operate on portions of the same fixed size. For example, if an embodiment performs data operations on portions of 16 blocks, additional blocks are retrieved even though only one particular block of the 16 is desired. In an embodiment performing a write operation which copies the same relative update identifier value to each block in the portion, a subsequent read operation for any block in that portion may result in evaluation of each relative update value for all blocks in the portion in connection with steps of flowchart 400 of FIG. 6. For example, steps 404 and 406 obtain the corresponding relative update values from GM and the device, and step 408 performs the comparison for each block's relative update identifiers. Step 408 may determine that the relative update values are the same only if all the relative update values for each block in the portion match. Otherwise, step 408 may evaluate to "different".

In another embodiment which also operates on fixed size portions for data operations, a write operation of a portion may be performed in which the relative update counter is copied only to those blocks of the portion which are the target of the write operation. A subsequent read operation to that portion may examine the relative update identifiers for all blocks in that portion. In connection with step 408 processing, if any single pair of relative update identifiers for a block (e.g., as obtained from GM and as stored with the corresponding user data on the physical device) match, then step 408 determines that the relative update identifiers are the same. This is in contrast to the previous embodiment in which a write operation results in the relative update counter being copied to all blocks in a portion independent of whether the blocks are modified by the write operation, and read operation processing at step 408 requires a determination that, for all blocks in the portion, each pair of relative update identifiers associated with a data block (e.g., from GM and from the physical device) match.

This latter embodiment may be used to provide a lesser degree of data validity and verification protection with the benefit of reducing the amount of processing time required to perform data transfer operations. What will now be described is a more detailed example of this latter embodiment.

Figure 7:
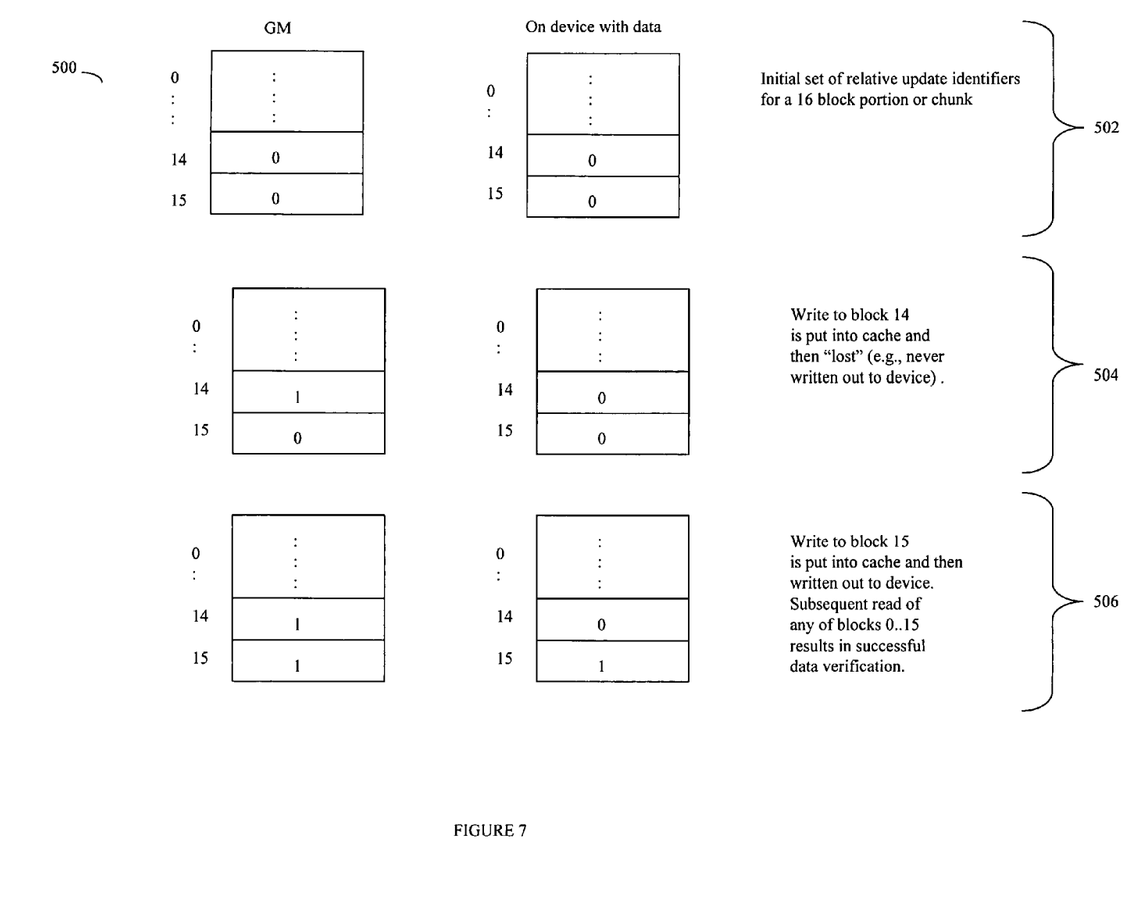
FIG. 7 is an example illustrating use of the relative update identifiers using the techniques described herein.

Referring now to FIG. 7, shown is an example 500 illustrating the relative update identifiers for each block in a chunk or portion of 16 blocks in accordance with the latter embodiment in which the relative update identifiers are modified for only those blocks which are the target of the write operation. In the first state 502, represented are values of the identifiers in an initial state. State 504 represents a next state in which a write operation for block 14 is received and placed into cache, but then is never actually written out to the physical device. State 506 represents a next subsequent state in which a write operation for block 15 is received and placed into cache. The write operation to block 15 is eventually written out to the physical device. A subsequent read to any of block numbers 0 through 15, inclusively, results in a successful determination when performing the processing steps of FIG. 6 as described above in the latter embodiment requiring only a single matching pair of relative update identifiers for any single block in the portion. Thus, a subsequent read to block 14 does not detect the lost or incomplete write to block 14. An embodiment may choose to utilize the latter embodiment described herein and just illustrated in order to reduce the processing incurred with each write operation, as in connection with another embodiment also described herein. An embodiment may determine that the occurrence of such a condition illustrated in FIG. 7 is small and tolerable at the benefit of not having to perform the extra processing associated with copying and examining all identifiers for all blocks in the portion.

As described herein in an embodiment, the relative update identifier associated with a particular user data block may be stored in the cache with the user data block while it is write pending. In this embodiment, an HA receiving the data may update the relative update identifier stored in the table 200 when the data is received, and then accordingly store the updated version of the identifier in the cache slot associated with the received data that is write pending.

In another embodiment, processing steps may be performed in accordance with techniques described herein in which the cached copy of the write pending data does not have the associated update identifier stored in the cache slot. In this embodiment, the HA, for example, may update the relative update identifier stored in the table 200 for a received user data block to be written if there is currently no write pending data for the same user data block. If there is already a write pending operation in the cache for the same user data block, the relative update identifier is not updated and the most recently received write operations are applied to the data already in the cache. When the DA is transferring the write pending data from the cache to the actual drive, the DA may then write the user data block with the relative update identifier from the table 200 to the drive. Subsequently, when the user data block and relative update identifier are read from the drive by the DA, the DA performs the verification processing, for example, as illustrated in FIG. 6. If the verification processing is successful, the DA stores the retrieved data into a cache slot without an associated relative update identifier.

In a variation of the foregoing, it should be noted that DA may also perform other processing on the relative update identifier retrieved from the disk and store a converted form of the relative update identifier in the cache slot with the user data block rather than no identifier. In this variation, when the user data is received, the relative update identifier for the received user data block is in a first form and is updated. When the data is written out to the disk by the DA, the DA converts the first form of the identifier to a second form and writes that second form out to the disk with the user data block. When the user data block is subsequently read, the DA reads the second form of the identifier, converts the second form back to the first form, and then performs the verification processing. If the verification processing is successful, the DA then writes the first form of the identifier with the user data block just read into a cache slot. In an embodiment, the foregoing conversion process may or may not result in a form of the relative update identifier being included in the cache slot. For example, in one embodiment, the Logical Block Reference Tag field 108, which includes the relative update identifier 110, may be stored with the user data on the disk. When the user data and other values, such as field 108, are read from the device, the conversion process as may be performed by the DA may result in field 108 (and thus 110) being replaced with a new value which does not preserve the contents of field 110. This new value included in the cached copy, may be, for example, a standard conforming value as defined in accordance with the DIF standard. In this example, the relative update identifier does not exist in the cached data and only exists in the drive's copy with the user data.

In connection with the techniques described herein, it should be noted that although the cached copy of the user data upon which processing is performed is stored in global memory, as will be appreciated by those skilled in the art, the user data may be located elsewhere when such processing is performed. For example, the techniques described herein may be performed when the user data is stored in local memory of a DA or other director.

In connection with the techniques described herein, the 2-bit relative update identifier may be stored in the Logical Block Reference Tag portion as illustrated in the format 100 of FIG. 3. In such an embodiment, a DA may perform other checking or verification steps in connection with the Logical Block Reference Tag value. Since the identifier is stored in the most significant bits of the Logical Block Reference Tag, it may be desirable to disable any such additional verification that may be performed on the Logical Block Reference Tag portion by system components, such as a disk drive, having no knowledge of the included relative update identifier.

The foregoing sets forth techniques that may be used in connection with detecting out-of-date or stale data as may be caused by lost or incomplete write operations which are received by a data storage system but fail to be written out to the physical device location. The foregoing techniques provide for early detection of stale data while minimizing additional storage costs associated with the detection thereof. In an embodiment utilizing mirrors, the most recent copy of data may be determined in accordance with the most recent relative update identifier. The techniques described herein may be used in connection with an industry standard format for storing user data.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for verifying data comprising:
   receiving a write operation request for writing to a first data block;
   updating a first copy of an identifier for said first data block in a memory;
   updating a second copy of said identifier for said first data block and storing said second copy with said first data block on a data storage device;
   receiving a read operation request for said first data block;
   reading said first data block and an associated identifier from the data storage device; and
   performing data verification processing for said first data block in accordance with said associated identifier, said first copy from the memory, and any pending write operations for said first data block, wherein a data verification error is determined if said first copy and said associated identifier match and there is at least one pending write operation for said first data block.

2. The method of claim 1, wherein said first copy of said identifier for said first data block is updated each time a write operation request is received.

3. The method of claim 1, wherein said method for verifying data is performed in a data storage system for data operations received from a host originating said data operations.

4. A method for verifying data comprising:
   receiving a write operation request for writing to a first data block;
   updating a first copy of an identifier for said first data block in a memory;
   updating a second copy of said identifier for said first data block and storing said second copy with said first data block on a data storage device;
   receiving a read operation request for said first data block;
   reading said first data block and an associated identifier from the data storage device;
   performing data verification processing for said first data block in accordance with said associated identifier, said first copy from the memory, and any pending write operations for said first data block; and
   determining that there is no data verification error if said first copy and said associated identifier match and there are no pending write operations for said first data block.

5. A method for verifying data comprising:
   receiving a write operation request for writing to a first data block;
   updating a first copy of an identifier for said first data block in a memory;
   updating a second copy of said identifier for said first data block and storing said second copy with said first data block on a data storage device;
   receiving a read operation request for said first data block;
   reading said first data block and an associated identifier from the data storage device;
   performing data verification processing for said first data block in accordance with said associated identifier, said first copy from the memory, and any pending write operations for said first data block; and
   determining that there is no data verification error if said first copy and said associated identifier are different, and a difference between a value of said first copy and a value of said associated identifier is in accordance with a number of pending write operation requests.

6. The method of claim 1, wherein said data verification processing includes determining if a write operation request was received and not written out to the physical device.

7. The method of claim 1, wherein said memory is a globally accessible memory in a data storage system, said first copy of said identifier being included in a structure stored in the memory, the structure having an identifier for each block of user data on the data storage device.

8. The method of claim 7, wherein said identifier for each block of user data represents a relative age of a version of data stored at said each block in comparison to another version of data stored at said each block at a different point in time.

9. The method of claim 8, wherein said identifier for each block of user data is a field having a size of two bits.

10. The method of claim 9, wherein said identifier for each block of user data is included in another field comprising the logical block address of said each block of user data on the data storage device.

11. The method of claim 5, wherein said difference corresponds to a relative age difference between a copy of said first data block associated with said first copy of the identifier and a current version of said first data block.

12. The method of claim 11, further comprising:
   determining, in accordance with said performing, that there is a data verification error, wherein there are two different versions of said first data block on two different mirrors in a data storage system, a first of said two different versions of said first data block having a first version of said associated identifier, a second of said two different versions of said first data block having a second version of said associated identifier; and
   using said first version and said second version of said associated identifier to determine a most recent version of said first data block.

13. A computer program product for verifying data comprising code that:
   receives a write operation request for writing to a first data block;
   updates a first copy of an identifier for said first data block in a memory;
   updates a second copy of said identifier for said first data block and storing said second copy with said first data block on a data storage device;
   receives a read operation request for said first data block;
   reads said first data block and an associated identifier from the data storage device; and
   performs data verification processing for said first block in accordance with said associated identifier, said first copy from the memory, and any pending write operations for said first data block, wherein, if said first copy and said associated identifier match and there are no pending write operations for said first data block, no data verification error is determined.

14. The computer program product of claim 13, further comprising code that:

determines a data verification error if said first copy and said associated identifier match and there is at least one pending write operation for said first data block.

15. The computer program product of claim 13, wherein said first copy of said identifier for said first data block is updated each time a write operation request is received.

16. A computer program product for verifying data comprising code that:
receives a write operation request for writing to a first data block;
updates a first copy of an identifier for said first data block in a memory;
updates a second copy of said identifier for said first data block and storing said second copy with said first data block on a data storage device;
receives a read operation request for said first data block;
reads said first data block and an associated identifier from the data storage device;
performs data verification processing for said first data block in accordance with said associated identifier, said first copy from the memory, and any pending write operations for said first data block; and
determines that there is no data verification error if said first copy and said associated identifier match and there are no pending write operations for said first data block, and determines that there is no data verification error if said first copy and said associated identifier are different, and a difference between a value of said first copy and a value of said associated identifier is in accordance with a number of pending write operation requests.

17. A data storage system comprising code that:
receives a write operation request for writing to a first data block;
updates a first copy of an identifier for said first data block in a memory;
updates a second copy of said identifier for said first data block and storing said second copy with said first data block on a data storage device; and
performs first processing in connection with a read operation request for said first data block, said code for said first processing including code that:
reads said first data block and an associated identifier from the data storage device; and
performs data verification processing for said first data block, wherein, if said first copy and said associated identifier are different and a difference between a value of said associated identifier is in accordance with a number of pending write operation requests, said data verification processing determines that there is no data verification error.

18. A data storage system comprising code that:
receives a write operation request for writing to a first data block;
updates a first copy of an identifier for said first data block in a memory;
updates a second copy of said identifier for said first data block and storing said second copy with said first data block on a data storage device;
receives a read operation request for said first data block;
reads said first data block and an associated identifier from the data storage device; and
performs data verification processing for said first data block in accordance with said associated identifier, said first copy from the memory, and any pending write operations for said first data block; and wherein said data storage system further includes said memory which is a globally accessible memory to components in said data storage system, said first copy of said identifier being included in a structure stored in the memory, the structure having an identifier for each block of user data on the data storage device.

19. The data storage system of claim 18, wherein said identifier for each block of user data represents a relative age of a version of data stored at said each block in comparison to another version of data stored at said each block at a different point in time, said identifier for each block of user data is a field having a size of two bits, said identifier for each block of user data being included in another field comprising the logical block address of said each block of user data on the data storage device.

* * * * *